(12) United States Patent
Bowden et al.

(10) Patent No.: US 8,818,626 B2
(45) Date of Patent: Aug. 26, 2014

(54) MOBILE DEVICE WIRELESS CAMERA INTEGRATION WITH A VEHICLE

(75) Inventors: Upton B. Bowden, Canton, MI (US); Theodore C. Wingrove, Canton, MI (US); Anthony J. Ciatti, Ann Arbor, MI (US); Michael Eichbrecht, Farmington Hills, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 62 days.

(21) Appl. No.: 13/529,730

(22) Filed: Jun. 21, 2012

(65) Prior Publication Data

US 2013/0345929 A1    Dec. 26, 2013

(51) Int. Cl.
*G06F 7/00* (2006.01)
*B60K 35/00* (2006.01)
*B60R 11/04* (2006.01)

(52) U.S. Cl.
CPC *B60K 35/00* (2013.01); *B60R 11/04* (2013.01)
USPC .............................................. 701/36; 348/148

(58) Field of Classification Search
CPC .......... B60K 37/06; B60K 35/00; B60R 1/00; B60R 11/04; H04N 7/181
USPC ................. 701/36; 348/148, 207.99; 386/224
See application file for complete search history.

(56) References Cited

U.S. PATENT DOCUMENTS

| | | | |
|---|---|---|---|
| 6,947,071 B2 | 9/2005 | Eichmann | |
| 7,195,381 B2 | 3/2007 | Lynam et al. | |
| 7,224,324 B2 | 5/2007 | Quist et al. | |
| 7,251,507 B2 * | 7/2007 | Kitao et al. | 455/569.2 |
| 7,344,284 B2 | 3/2008 | Lynam et al. | |
| 7,619,508 B2 | 11/2009 | Lynam et al. | |
| 7,731,403 B2 | 6/2010 | Lynam et al. | |
| 7,982,768 B2 * | 7/2011 | Chien et al. | 348/148 |
| 8,072,318 B2 | 12/2011 | Lynam et al. | |

(Continued)

OTHER PUBLICATIONS

Safety Vision LLC; "SafeDrive MiniDVR for Driver Safety" http://www.safetyvision.com/safedrive-minidvr.

(Continued)

*Primary Examiner* — Mary Cheung
(74) *Attorney, Agent, or Firm* — Klintworth & Rozenblat IP LLC (57) ABSTRACT

A vehicle monitoring system includes a vehicle, a mobile camera device, a transmitter or transmitting transceiver, a receiver or receiving transceiver, and an integrated vehicle cockpit display. The mobile camera device, comprising a processor and a camera, is located within the vehicle or attached to the vehicle for taking an image or video within or outside the vehicle. The transmitter or transmitting transceiver is in communication with the mobile camera device for transmitting the image or the video taken by the mobile camera device. The receiver or receiving transceiver is for receiving the image or the video, taken by the mobile camera device, from the transmitter or the transmitting transceiver. The integrated vehicle cockpit display, built into the vehicle, is in communication with the receiver or the receiving transceiver for displaying the received image or the received video taken by the mobile camera device.

20 Claims, 5 Drawing Sheets

(56) References Cited

U.S. PATENT DOCUMENTS

| | | | |
|---|---|---|---|
| 2001/0055373 A1* | 12/2001 | Yamashita | 379/90.01 |
| 2004/0225425 A1* | 11/2004 | Kindo et al. | 701/36 |
| 2004/0233284 A1* | 11/2004 | Lesesky et al. | 348/148 |
| 2005/0151844 A1 | 7/2005 | Chiao et al. | |
| 2006/0047375 A1 | 3/2006 | Eichmann | |
| 2006/0232389 A1* | 10/2006 | Chu | 340/425.5 |
| 2007/0135979 A1* | 6/2007 | Plante | 701/35 |
| 2009/0284598 A1 | 11/2009 | Busch et al. | |
| 2009/0290021 A1 | 11/2009 | Rudesill et al. | |
| 2013/0141582 A1* | 6/2013 | Reilhac | 348/148 |

OTHER PUBLICATIONS

Hanlon, Mike; "BabyCam back seat monitoring system"; Jul. 23, 2005; http://www.gizmag.com/go/4312/.

* cited by examiner

MOBILE DEVICE WIRELESS CAMERA INTEGRATION WITH A VEHICLE

FIELD OF THE DISCLOSURE

The disclosure relates to vehicle monitoring systems.

BACKGROUND OF THE DISCLOSURE

Systems and methods exist for monitoring people, animals, objects, activities, or conditions within or outside a vehicle. Some of these systems and methods use after-market camera devices and displays which are used to display the images or videos taken by the camera devices on the displays. However, these systems and methods typically do not display the images on the integrated vehicle cockpit display, and the user is limited to using the after-market camera device for shooting the image or video.

There is a need for a vehicle monitoring system and method which displays the image or video taken by the camera device on an integrated vehicle cockpit display, and which uses a more adaptable, user-friendly camera device to take the image or video without having to purchase an after-market camera device and display.

SUMMARY OF THE DISCLOSURE

In one embodiment, a vehicle monitoring system includes a vehicle, a mobile camera device, a transmitter or transmitting transceiver, a receiver or receiving transceiver, and an integrated vehicle cockpit display. The mobile camera device, comprising a processor and a camera, is located within the vehicle or attached to the vehicle for taking an image or video within or outside the vehicle. The transmitter or transmitting transceiver is in communication with the mobile camera device for transmitting the image or the video taken by the mobile camera device. The receiver or receiving transceiver is for receiving the image or the video, taken by the mobile camera device, from the transmitter or the transmitting transceiver. The integrated vehicle cockpit display, built into the vehicle, is in communication with the receiver or the receiving transceiver for displaying the received image or the received video taken by the mobile camera device.

In another embodiment, a vehicle monitoring system includes a vehicle, a mobile camera holding device, a receiver or receiving transceiver, and an integrated vehicle cockpit display. The mobile camera holding device is attached to the vehicle and sized to hold a mobile camera device comprising a processor and a camera. The receiver or receiving transceiver is for receiving image or video taken when a mobile camera device is secured to the mobile camera holding device. The integrated vehicle cockpit display, built into the vehicle, is in communication with the receiver or the receiving transceiver for displaying the received image or the received video taken when a mobile camera device is secured to the mobile camera holding device.

In still another embodiment, a method of vehicle monitoring is disclosed. In one step, an image or video is taken within or outside a vehicle using a mobile camera device, comprising a processor and a camera, located within the vehicle or attached to the vehicle. In another step, the image or the video taken by the mobile camera device is displayed on an integrated vehicle cockpit display built in the vehicle.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
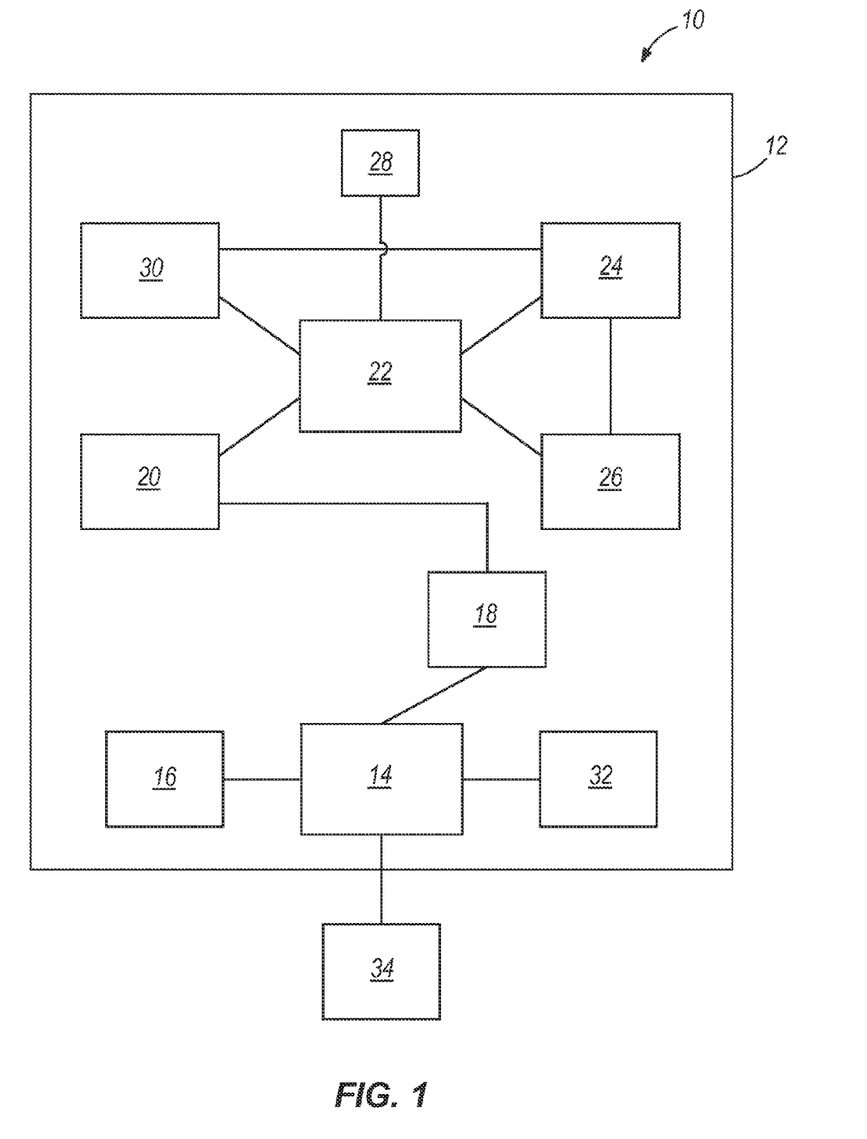
FIG. 1 illustrates a block diagram of one embodiment of a vehicle monitoring system.

FIG. 1 illustrates a block diagram of one embodiment of a vehicle monitoring system 10 comprising a vehicle 12, a mobile camera device 14, a holding device 16, a first communication device 18, a second communication device 20, an integrated vehicle cockpit display 22, a processor 24, a memory 26, an alert 28, and a control 30. Any of the components of the vehicle monitoring system 10 may be singular or plural in number, and may be in communication with one another wirelessly, using Bluetooth, DLNA (Digital Living Network Alliance), Wi-Fi, infrared, radio frequency waves, one or more other wireless communication systems, or through the use of wired communication. The vehicle monitoring system may be used to monitor a person, activity, or condition inside 32 or outside 34 the vehicle 12.

The vehicle 12 comprises an automobile, an aircraft, or any type of vehicle used for transporting people or objects. The holding device 16 comprises a mobile camera holding device attached to the vehicle 12 and sized to hold the mobile camera device 14. The holding device 16 may be attached to any portion of the vehicle 12 such as a front or back seat, a ceiling, the vehicle cockpit, a dashboard, a window, or another portion of the vehicle 12 in a position in which the mobile camera device 14 will be positioned to monitor the desired person, object, activity, or condition inside 32 or outside 34 the vehicle 12. The holding device 16 may be adapted to move, rotate, tilt, or be held in a fixed position.

The mobile camera device 14, comprising a processor and a camera such as a portable device having a processor connected with a camera in a housing, is located within the vehicle 12 or attached to the vehicle 12 for taking an image or video inside 32 or outside 34 the vehicle 12. The mobile camera device 14 may comprise a mobile phone, an MP3, a tablet, or another type of mobile camera device. In one embodiment, the mobile camera device 14 may be held by an occupant, such as a child, within the vehicle 12 allowing the mobile camera device 14 to take video or images of the occupant or other video or images at which the occupant aims the mobile camera device 14. In another embodiment, the mobile camera device 14 may be held by the holding device 16 attached to the vehicle 12 to monitor the desired person, object, activity, or condition inside 32 or outside 34 the vehicle 12. The mobile camera device 14 may take images inside 32 the vehicle 12 of a driver of the vehicle 12, front or back seat occupants of the vehicle 12, a baby in a back-seat reverse facing baby-seat, or other activities or conditions within the vehicle 12. The mobile camera device 14 may also be used to take images outside 34 the vehicle 12 of a person, activity, or condition such as other vehicles or structures, pedestrians, animals, signs, vehicle lanes, obstructions, or obstacles. Any number of mobile camera devices 14 may be used to take images or video inside 32 or outside the vehicle 12.

The first communication device 18 comprises a communication device in communication with the mobile camera device 14 for transmitting the image or video taken by the mobile camera device 14 to the second communication device 20. The first communication device 18 may also be configured to receive a signal from the second communication device 20 and to communicate the signal to the mobile camera device 14. The first communication device 18 may comprise a transmitter alone, a transmitter and a receiver, or a transceiver. The first communication device 18 may comprise a portion of the mobile camera device 14, or may be separate from the mobile camera device 14 and in communication with the mobile camera device 14. The first communication device 18 may be configured to transmit or receive signals wirelessly, using Bluetooth, DLNA (Digital Living Network Alliance), Wi-Fi, infrared, radio frequency waves, one or more other wireless communication systems, or through the use of wired communication.

The second communication device 20 comprises a communication device in communication with the first communication device 18 for receiving the transmitted image or video taken by the mobile camera device 14 from the first communication device 18 and communicating it to the integrated vehicle cockpit display 22. The second communication device 20 may also be configured to transmit a signal, from the integrated vehicle cockpit display 22, the processor 24, the memory 26, the alert 28, or the control 30, to the first communication device 18. The second communication device 20 may comprise a receiver alone, a receiver and a transmitter, or a transceiver. The second communication device 20 may comprise a portion of the cockpit display 22 or may be attached to any portion of the vehicle 12. The second communication device 20 may be configured to receive or transmit signals wirelessly, using Bluetooth, DLNA (Digital Living Network Alliance), Wi-Fi, infrared, radio frequency waves, one or more other wireless communication systems, or through the use of wired communication.

The integrated vehicle cockpit display 22 comprises a center-stack, an instrument cluster, an infotainment system, a navigational system, or another type of integrated vehicle cockpit display which was built into the vehicle 12 at the time of its manufacture. The integrated vehicle cockpit display 22 is in communication with the second communication device 20 and is used to display the image or video taken by the mobile camera device 14 of a person, object, activity, or condition inside 32 or outside 34 the vehicle 12 which was received by the second communication device 20. In such manner, a driver of the vehicle 12 may view an image or video taken by the mobile camera device 14 of a person, activity, or condition inside 32 or outside 34 the vehicle 12.

The processor 24 is in communication with the integrated vehicle cockpit display 22 allowing any needed processing to take place. The processor 24 may comprise a portion of the integrated vehicle cockpit display 22 or may be separate from the integrated vehicle cockpit display 22. In one embodiment, the processor 24 may contain a processing algorithm which is designed to determine whether the driver is drowsy, drunk, distracted, using a mobile phone, texting, or in another state. In another embodiment, the processor 24 may determine whether a passenger of the vehicle 12, such as a child or baby, is sleeping, sick, fighting, or in another state. In still another embodiment the processor 24 may determine whether a pedestrian, structure, animal, or other obstacle is an impediment to the vehicle 12, may detect, interpret, or translate signs, may issue a lane departure warning, may assist with augmented reality outside the vehicle 12, or may process other conditions or states within or outside the vehicle 12.

The memory 26 is in communication with the integrated cockpit display 22 and processor 24 for recording data, images, or video from the processor 24 or mobile camera device 14. In one embodiment, the memory 26 may store images or video from taken by the mobile camera device 14 for playback on the integrated vehicle cockpit display 22. For instance, if static images are desired to refresh within a certain time frame, the memory 26 may store the static images and send the static images to the integrated vehicle cockpit display 22 as directed by the integrated vehicle cockpit display 22, processor 24, or control 30 according to the desired time frame. In other embodiments, the memory 26 may be used for various purposes.

The control 30 comprises a control for controlling the mobile camera device 14. In one embodiment, the control 30 comprises an integrated vehicle cockpit control in communication, wirelessly using the first and second communication devices 18 and 20 or through wires, with the mobile camera device 14 for controlling the mobile camera device 14. The control 30 may allow the user, such as a driver or passenger, to control functions of the mobile camera device 14 such as zooming in or out of the mobile camera device 14, power on or off of the mobile camera device 14, control over whether static images on a desired time-interval or continuous video is sent from the mobile camera device 14 to the integrated vehicle cockpit display 22, movements of the mobile camera device 14 or holding device 16, or other functions.

Figure 2:
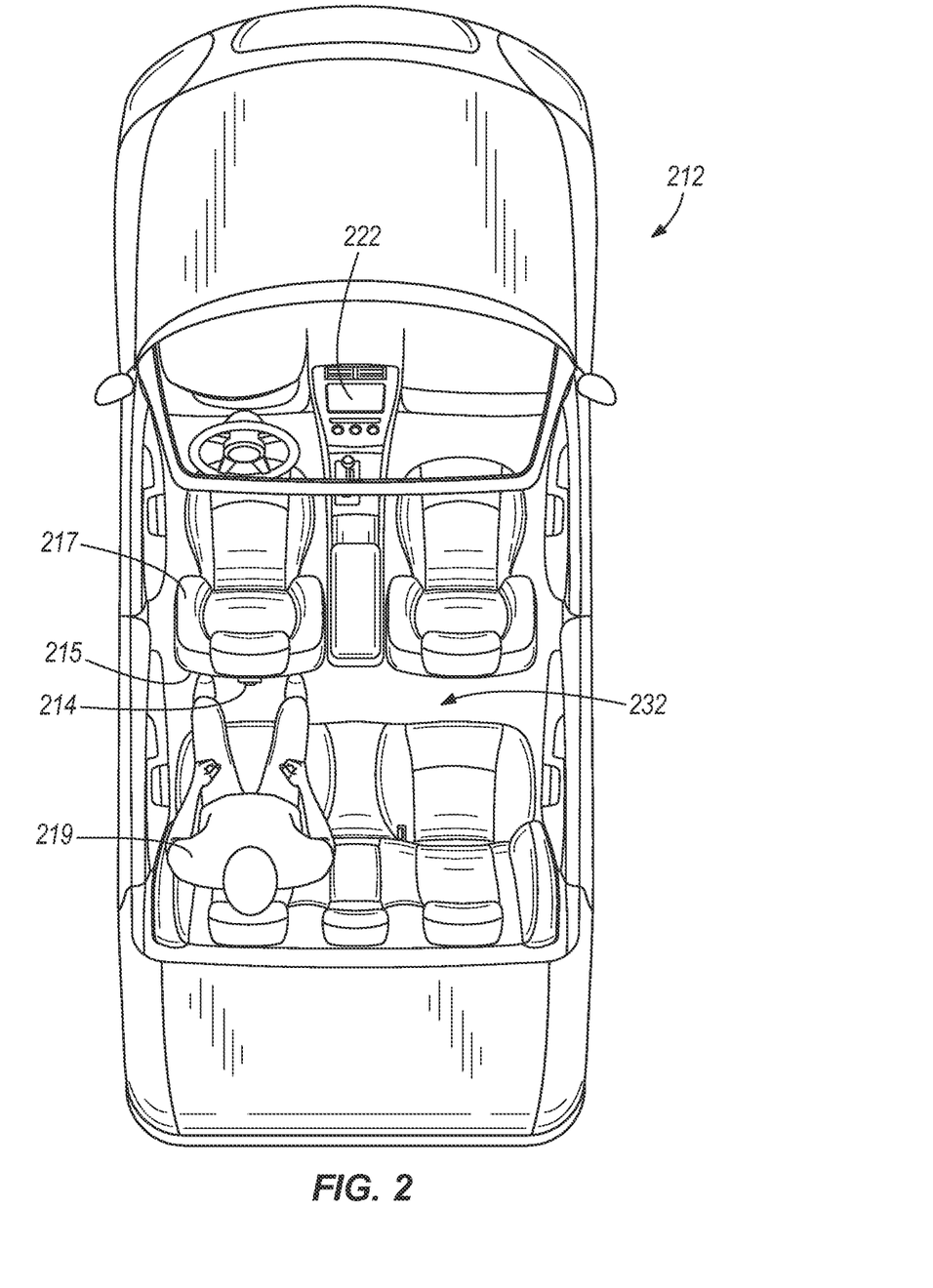
FIG. 2 illustrates a view within one embodiment of a vehicle having a mobile camera device attached to a back portion of a front seat of the vehicle.

FIG. 2 illustrates a view within one embodiment of a vehicle 212 having a mobile camera device 214 attached to a back portion 215 of a front seat 217 of the vehicle 212. The mobile camera device 214 is positioned to take an image or a video of a back-seat occupant 219 within 232 the vehicle 212 and to send the image or video, wirelessly using the components previously discussed with respect to the embodiment of FIG. 1, to an integrated vehicle cockpit display 222. In other embodiments, the mobile camera device 214 may be located in varying positions relative to the vehicle 212 in order to take any desired image or video to transmit it to the integrated vehicle cockpit display 222.

Figure 3:
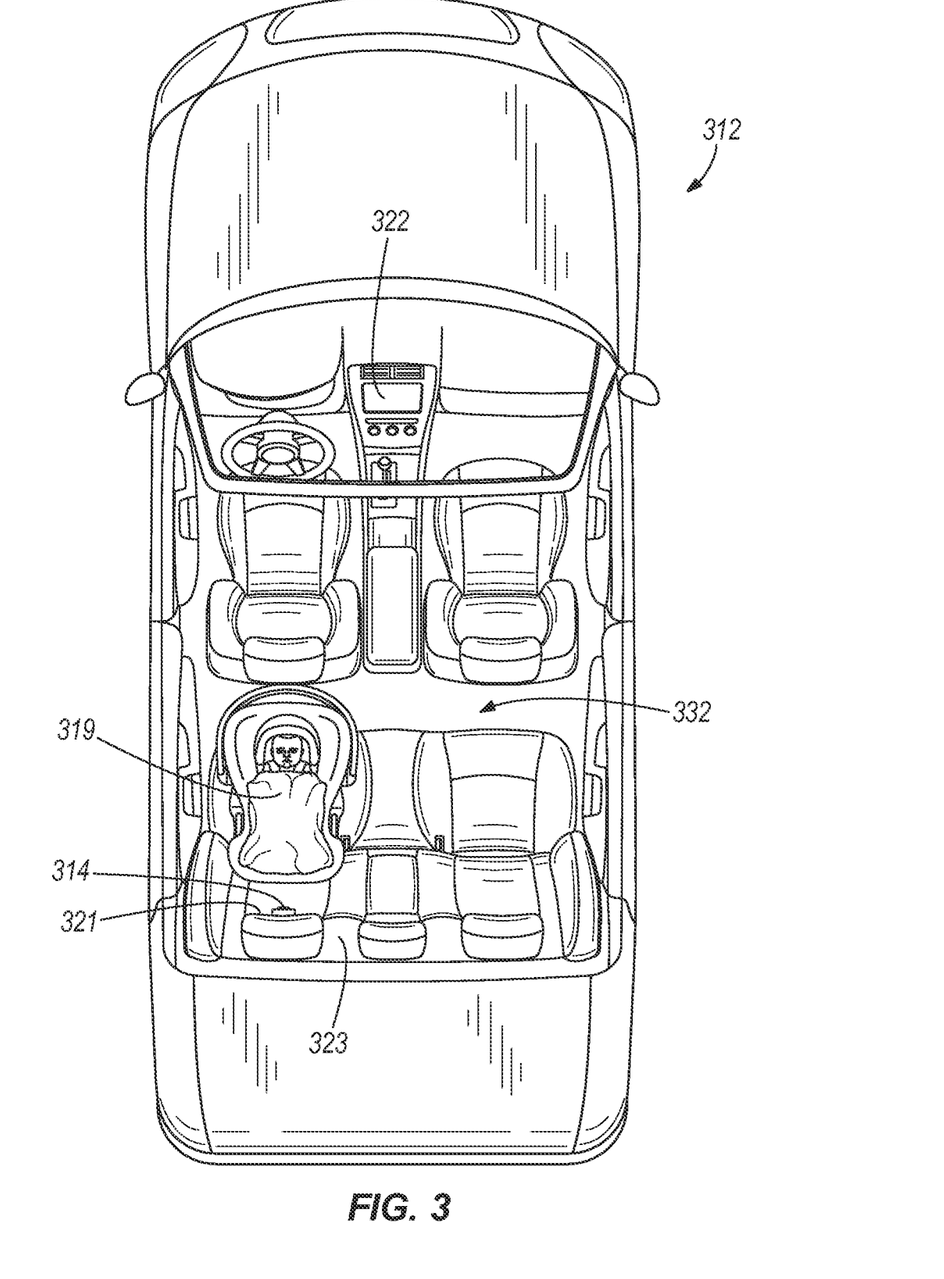
FIG. 3 illustrates a view within one embodiment of a vehicle having a mobile camera device attached to a front portion of a front seat of the vehicle.

FIG. 3 illustrates a view within one embodiment of a vehicle 312 having a mobile camera device 314 attached to a front portion 321 of a back seat 323 of the vehicle 312. The mobile camera device 314 is positioned to take an image or a video of a back-seat occupant 319, such as a backwards seated baby sitting in a backward facing baby-seat, within 332 the vehicle 312 and to send the image or video, wirelessly using the components previously discussed with respect to the embodiment of FIG. 1, to an integrated vehicle cockpit display 322. In other embodiments, the mobile camera device 314 may be located in varying positions relative to the vehicle 312 in order to take any desired image or video to transmit it to the integrated vehicle cockpit display 322.

Figure 4:
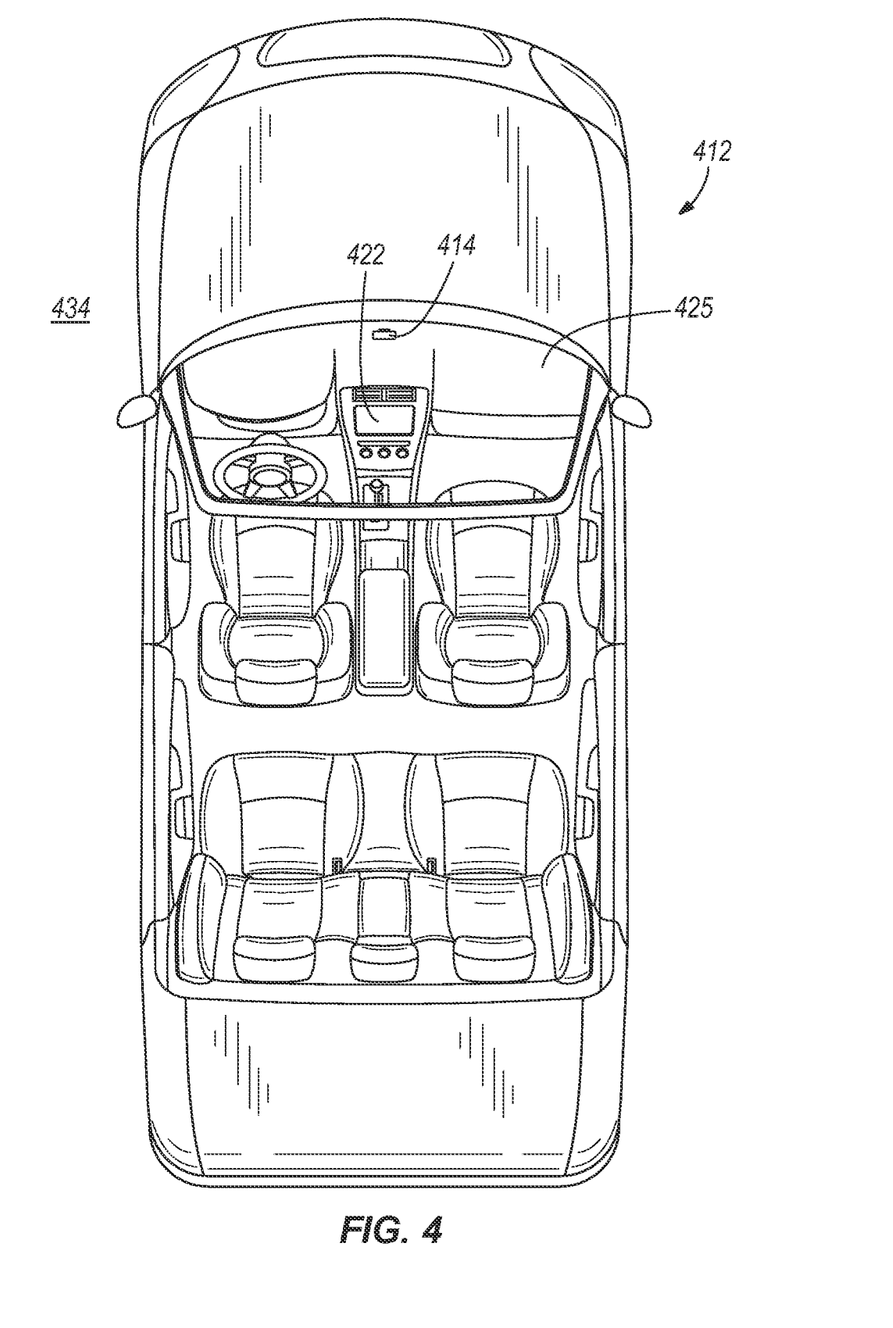
FIG. 4 illustrates a view within one embodiment of a vehicle having a mobile camera device attached to a dashboard of the vehicle.

FIG. 4 illustrates a view within one embodiment of a vehicle 412 having a mobile camera device 414 attached to a dashboard 425 of the vehicle 412. The mobile camera device 414 is positioned to take an image or a video of a person, object, condition, or activity outside 434 the vehicle 412 and to send the image or video, wirelessly using the components previously discussed with respect to the embodiment of FIG. 1, to an integrated vehicle cockpit display 422. In other embodiments, the mobile camera device 414 may be located in varying positions relative to the vehicle 412 in order to take any desired image or video to transmit it to the integrated vehicle cockpit display 422.

Figure 5:
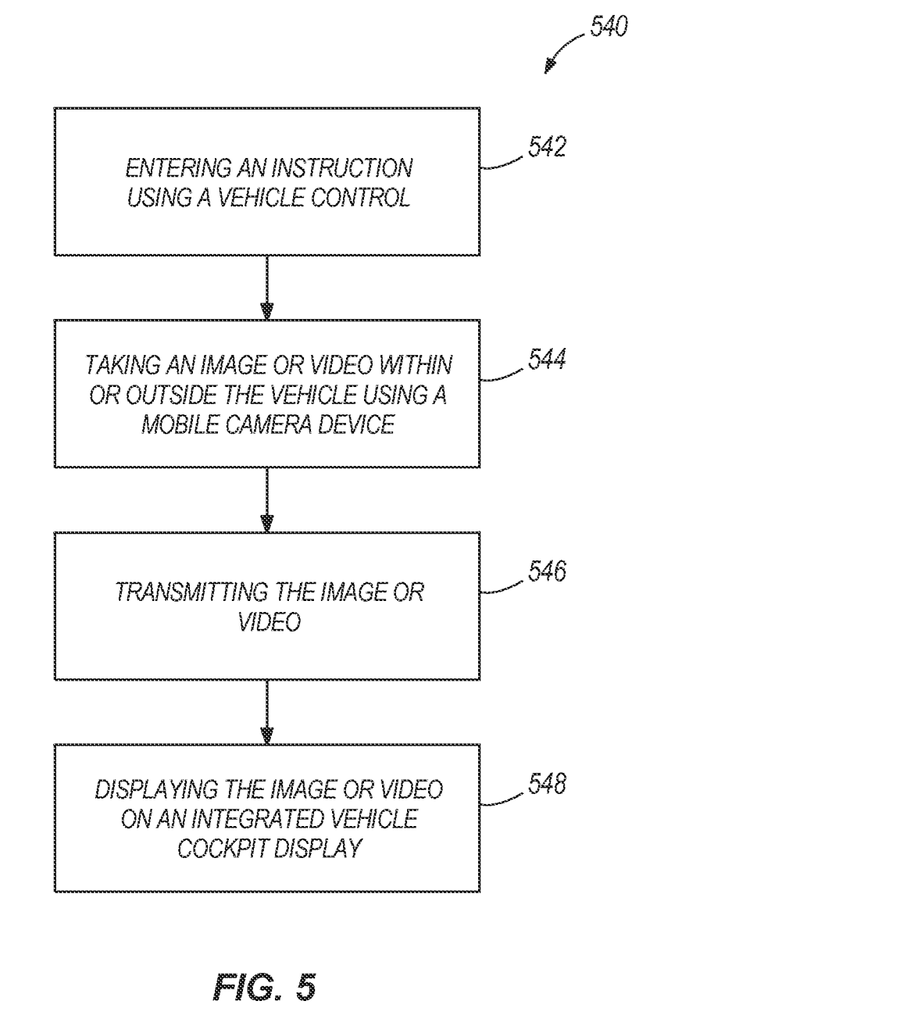
FIG. 5 is a flowchart of one embodiment of a method of vehicle monitoring.

FIG. 5 is a flowchart of one embodiment of a method 540 of vehicle monitoring. The method 540 may utilize any of the components or disclosure disclosed above with respect to FIGS. 1-4. In step 542, a driver or passenger of a vehicle may enter an instruction using a control of the vehicle for an image or video to be taken within or outside the vehicle using one or more mobile camera devices. The instruction may control whether an image or video is taken, the time-frame a static image is updated, what person, object, condition, or activity within or outside the vehicle is observed using the mobile camera device, functions of the mobile camera device such as power, zooming, or other functions, movement of the mobile camera device or a holding device to which the mobile camera device is attached, which of multiple camera devices is used, the switching between images or video taken by multiple camera devices, or control another function. In step 544, an image or video is taken within or outside a vehicle using a mobile camera device, comprising a processor and a camera such as a portable device having a processor connected with a camera in a housing, located within the vehicle or attached to the vehicle. The mobile camera device may comprise a mobile phone, an MP3, a tablet, or another type of mobile camera device. The image or video may be of a person, object, condition, or activity within or outside the vehicle. In step 546, the image or the video taken by the mobile camera device is transmitted using a first communication device in communication with the mobile camera device to a second communication device in communication with an integrated vehicle cockpit display. In step 548, the image or video taken by the mobile camera device is displayed on an integrated vehicle cockpit display built into the vehicle. The integrated vehicle cockpit display comprises a center-stack, an instrument cluster, an infotainment system, or a navigational system.

Optionally, the image or video may be recorded using a memory of the vehicle monitoring system. Optionally, a processor of the vehicle monitoring system may determine the condition or presence of a person, activity, or condition such as of an occupant, the driver, other vehicles or structures, pedestrians, animals, signs, vehicle lanes, obstructions, or obstacles and report the determination to the driver or a passenger visually or using audio. Optionally, the processor may issue an alert or warning to the driver or passenger if required based on the determination.

One or more embodiments of the disclosure may reduce one or more problems associated with one or more of the existing systems or methods for vehicle monitoring by providing a vehicle monitoring system and method which displays an image or video taken by a camera device on an integrated vehicle cockpit display, and which uses a more adaptable, user-friendly, mobile camera device to take the image or video without having to purchase an after-market camera device and display.

It should be understood, of course, that the foregoing relates to exemplary embodiments of the disclosure and that modifications may be made without departing from the spirit and scope of the disclosure as set forth in the following claims.

We claim:

1. A vehicle monitoring system comprising:
a vehicle;
a mobile camera device located within the vehicle or attached to the vehicle for directly shooting itself an image or video within or outside the vehicle, the mobile camera device comprising a mobile phone, an MP3, a tablet, or a hand-held portable device having a processor;
a transmitter or transmitting transceiver in communication with the mobile camera device for transmitting the image or the video directly shot by the mobile camera device itself;
a receiver or receiving transceiver for receiving the image or the video, directly shot by the mobile camera device itself, from the transmitter or the transmitting transceiver; and
an integrated vehicle cockpit display, built into the vehicle, in communication with the receiver or the receiving transceiver for displaying the received image or the received video directly shot by the mobile camera device itself.

2. The vehicle monitoring system of claim 1 wherein the integrated vehicle cockpit display comprises a center-stack, an instrument cluster, an infotainment system, or a navigational system.

3. The vehicle monitoring system of claim 1 wherein the mobile camera device is located within the vehicle and positioned to directly shoot itself the image or the video of an occupant inside the vehicle.

4. The vehicle monitoring system of claim 3 wherein the mobile camera device is positioned to directly shoot itself the image or the video of a back-seat occupant inside the vehicle.

5. The vehicle monitoring system of claim 1 wherein the mobile camera device is attached to a seat of the vehicle.

6. The vehicle monitoring system of claim 1 wherein the mobile camera device is positioned to directly shoot itself the image or the video of a person outside of and adjacent to the vehicle, an object outside of and adjacent to the vehicle, an activity outside of and adjacent to the vehicle, or a condition outside of and adjacent to the vehicle.

7. The vehicle monitoring system of claim 1 wherein the transmitter or the transmitting transceiver is operable to transmit wirelessly using Bluetooth, DLNA, Wi-Fi, Infrared, or radio frequency waves.

8. The vehicle monitoring system of claim 1 further comprising an integrated vehicle cockpit control in communication with the mobile camera device for controlling the mobile camera device by wirelessly transmitting control signals from the integrated vehicle cockpit control to the mobile camera device.

9. The vehicle monitoring system of claim 1 further comprising a mobile camera holding device attached to the vehicle holding the mobile camera device.

10. A vehicle monitoring system comprising:
a vehicle;
a mobile camera holding device attached to the vehicle and sized to hold a mobile camera device, the mobile camera device comprising a mobile phone, an MP3, a tablet, or a hand-held portable device having a processor;
a receiver or receiving transceiver for receiving image or video directly shot by the mobile camera device itself when the mobile camera device is secured to the mobile camera holding device; and
an integrated vehicle cockpit display, built into the vehicle, in communication with the receiver or the receiving transceiver for displaying the received image or the received video directly shot by the mobile camera device itself when the mobile camera device is secured to the mobile camera holding device.

11. The vehicle monitoring system of claim 10 wherein the integrated vehicle cockpit display comprises a center-stack, an instrument cluster, an infotainment system, or a navigational system.

12. The vehicle monitoring system of claim 10 wherein the mobile camera holding device is positioned so that when the mobile camera device is secured to the mobile camera holding device the mobile camera device will directly shoot itself the image or the video of an occupant inside the vehicle.

13. The vehicle monitoring system of claim 12 wherein the mobile camera holding device is positioned so that when the mobile camera device is secured to the mobile camera holding device the mobile camera device will directly shoot itself the image or the video of a back-seat occupant inside the vehicle.

14. The vehicle monitoring system of claim 10 wherein the mobile camera holding device is attached to a seat of the vehicle.

15. The vehicle monitoring system of claim 10 wherein the mobile camera holding device is positioned so that the mobile camera device will directly shoot itself the image or the video of a person outside of and adjacent to the vehicle, an object outside of and adjacent to the vehicle, an activity outside of and adjacent to the vehicle, or a condition outside of and adjacent to the vehicle.

16. A method of vehicle monitoring comprising:

directly shooting an image or video within or outside a vehicle using a mobile camera device itself while the mobile camera device is located within the vehicle or attached to the vehicle, the mobile camera device comprising a mobile phone, an MP3, a tablet, or a hand-held portable device having a processor; and displaying the image or the video directly shot by the mobile camera device itself on an integrated vehicle cockpit display built into the vehicle.

17. The method of claim 16 further comprising transmitting the image or the video directly shot by the mobile camera device itself, using a transmitter or transmitting transceiver in communication with the mobile camera device, to a receiver or receiving transceiver in communication with the integrated vehicle cockpit display.

18. The method of claim 16 wherein the integrated vehicle cockpit display comprises a center-stack, an instrument cluster, an infotainment system, or a navigational system.

19. The method of claim 16 further comprising the mobile camera device directly shooting itself the image or the video of an occupant inside the vehicle.

20. The method of claim 16 further comprising the mobile camera device directly shooting itself the image or the video of a person outside of and adjacent to the vehicle, an object outside of and adjacent to the vehicle, an activity outside of and adjacent to the vehicle, or a condition outside of and adjacent to the vehicle.

* * * * *